United States Patent [19]
Ohyama et al.

[11] 3,868,681
[45] Feb. 25, 1975

[54] CHARACTER INPUT EQUIPMENT

[75] Inventors: Chishio Ohyama; Makoto Tachibana; Takeshi Takada, all of Tokyo, Japan

[73] Assignee: Nippon Electric Company, Limited, Tokyo-to, Japan

[22] Filed: Sept. 21, 1972

[21] Appl. No.: 290,981

[30] Foreign Application Priority Data

Oct. 4, 1971 Japan .............................. 46-77021

[52] U.S. Cl. .............................. 340/365, 178/17 C
[51] Int. Cl. .............................. G08c 1/00
[58] Field of Search ............. 340/347 AD, 173 MS, 340/347 DD, 347 P, 365, 172.5; 33/1 M; 178/18, 19, 20, 17 C, 17 A

[56] References Cited

UNITED STATES PATENTS

| | | | |
|---|---|---|---|
| 3,469,242 | 9/1969 | Eachus et al. | 340/365 |
| 3,521,268 | 7/1970 | Miller | 340/347 DD |
| 3,530,437 | 9/1970 | Booker | 178/18 |
| 3,598,903 | 8/1971 | Johnson | 178/18 |
| 3,623,082 | 11/1971 | Stein et al. | 340/365 |
| 3,646,550 | 2/1972 | Anacker | 340/347 DD |
| 3,648,277 | 3/1972 | Whetstone | 178/18 |
| 3,683,371 | 8/1972 | Holz | 340/365 |
| 3,705,956 | 12/1972 | Dertouzos | 178/18 |

*Primary Examiner*—Charles D. Miller
*Attorney, Agent, or Firm*—Ostrolenk, Faber, Gerb & Soffen

[57] ABSTRACT

Electronic hardware especially adapted for use in converting each one of a group of characters into binary digital information comprising a character matrix for visually identifying each selectable character. An electronic matrix positioned beneath the character matrix and comprised of perpendicularly aligned drive and sense line sets is pulsed in a predetermined sequential fashion to create current pulses in each of the current drive lines. A bar which is selectively positionable adjacent any one of the characters creates an inductive path between the drive and sense lines which intersect at the location of the desired character causing a detection circuit to indicate this condition and terminate the sequential stepping. The sense lines are provided with activating circuits for selectively coupling each of the sense lines to the detection means which halts the operations of the drive and sense line control circuits when the desired character has been detected. The outputs of the drive and sense line control circuits may then be converted into binary digital information representing any one of the selectable characters.

1 Claim, 5 Drawing Figures

CHARACTER INPUT EQUIPMENT

BACKGROUND OF THE INVENTION AND RELATED PRIOR ACTIVITY

The present invention relates to a character input equipment for code-converting an arbitrarily designated character into an electrical signal, and more particularly to the equipment for producing the character-representing signals suitable for processing in information handling units and the like.

Stated briefly, the character input equipment of the present invention is adapted to convert characters such as "kanji (Chinese characters)" into binary-coded signals corresponding to the positions on the character-position indication plate, and to supply the signals to a computer, an external memory of the paper tape, magnetic tape, magnetic disc, or magnetic drum type, or a (CRT) display, or a line printer.

One example of such an input equipment is disclosed in a paper titled "A MAGNETIC DEVICE FOR COMPUTER GRAPHIC INPUT" published in the PROCEEDINGS-FALL JOINT COMPUTER CONFERENCE, 1965, Pages 831 – 838. In this prior art equipment, a magnetic head (in FIG. 1 of the article) in the pen tip consisting of a small, linear ferrite core with an air gap and windings, is brought close to a wire segment. As a periodic driving pulse is supplied under this state through the windings to the magnetic head, a voltage pulse is induced in the wire segment. Then, the voltage pulse is converted into a binary signal. More specifically, as shown in FIG. 2 of the aforesaid article, the winding plane provided to permit the writing of a graph with the head is divided into m sectors each having n winding stripes arranged to supply the induced voltage pulses correponding to the binary signals to the winding terminals. Under this state, if the head is in close proximity to the sector 1 (in FIG. 2 of the article), the input corresponding to the desired graph is converted into binary signals.

In this prior art equipment, however, there must be a number of sectors (for example, stacked perpendicularly) with each sector having many winding stripes to convert the graph into binary signals. For this reason, the equipment becomes more costly to manufacture and more complicated. Also, as shown in FIG. 2 of the article, since the voltages induced through the sector 1 and corresponding to the graph are obtained from the winding terminals in the righthand direction, the voltages undergo a significant amount of attenuation before they reach the terminals. Thus, the amplitude of the resultant binary-coded signals tends to be greatly lowered. Moreover, the magnetic head in FIG. 1 of the article must be positioned to form an angle of 45° with X and Y-direction windings, respectively (as recited on page 835 - right-hand column of the article). In addition, the winding to apply the periodic drive voltage pulse to the head is indispensable to the graph input. As a result, the head becomes more complicated in structure.

OBJECTS OF THE INVENTION

It is, therefore, one object of the present invention to provide a character input equipment free from the above-mentioned disadvantages of the prior art equipment.

The character input equipment of the present invention comprises: a character plate having a plurality of characters arranged in rows and columns in a matrix form; a plurality of current drive lines disposed corresponding to the rows beneath the character plate; a plurality of current drive circuits for supplying a current in sequence to the plurality of current drive lines; a plurality of sense lines disposed corresponding to the columns under the plate and perpendicularly intersecting the current drive lines; sense-line selection circuits for sequentially selecting the plurality of sense lines; an indication bar for indicating a desired character on the plate one at a time and for electro-magnetically coupling a pair of current drive lines with a pair of sense lines corresponding to the character being selected; and a sense-signal detection circuit through which the change in the current caused by bringing of the bar into close contact with the desired character is sensed by the sense line corresponding to the desired character in the column position on the plate, said current being the current supplied to the current drive line corresponding to the desired character in the row position on the plate.

BRIEF DESCRIPTION OF THE FIGURES

The above, as well as other objects of the present invention will become apparent from the following detailed description and taken in conjunction with the accompanying drawings, of which.

DETAILED DESCRIPTION OF THE FIGURES

Figure 1:
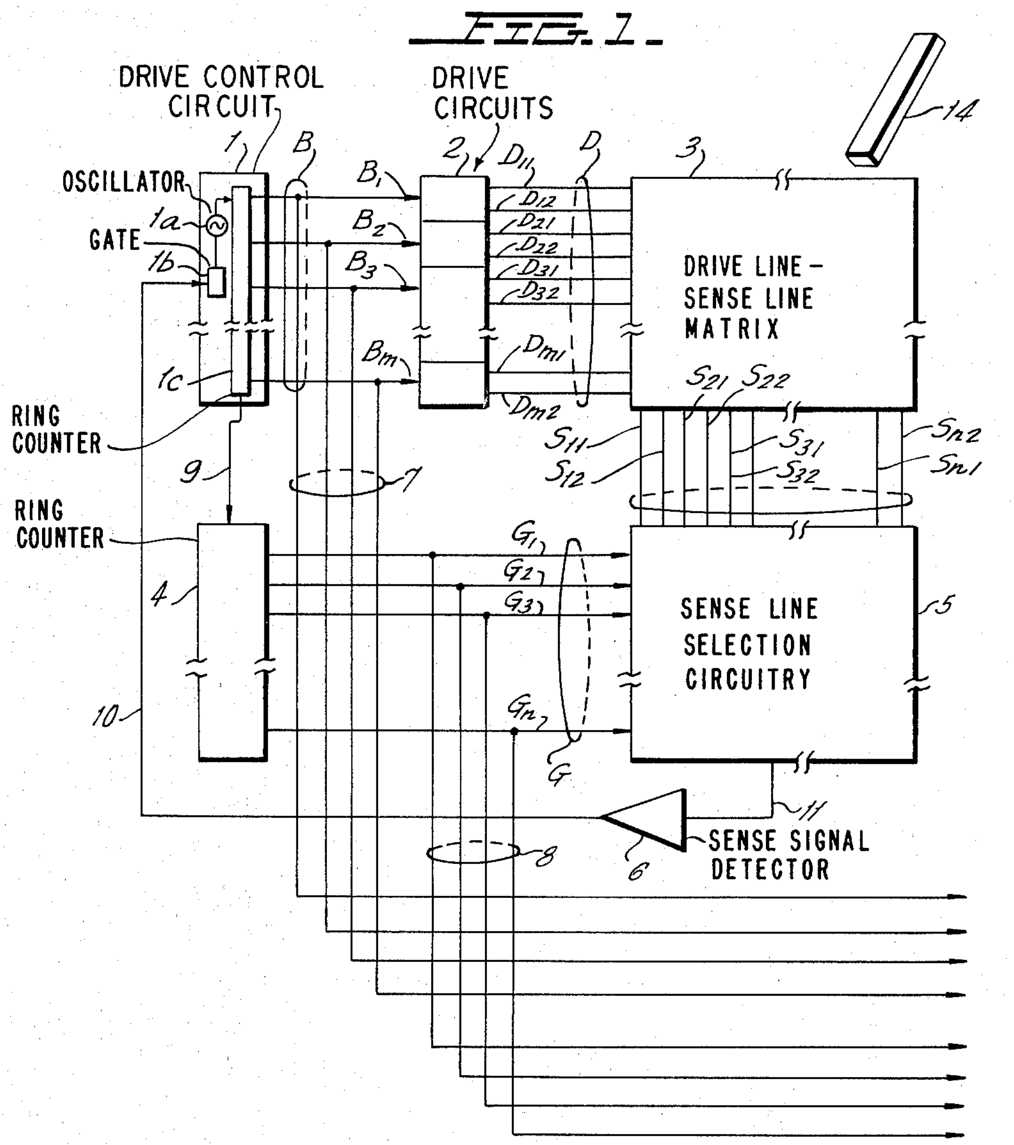
FIG. 1 shows a block diagram of one embodiment of the present invention.

In FIG. 1 which shows a block diagram of one embodiment of this invention, the character input equipment of this invention includes a drive control circuit 1, current drive circuits 2, a character-position indication plate 3, sense-line selection circuits 5, a circuit 4 for controlling the circuit 5, a sense-signal detection circuit 6, and an indication bar 14..

It is assumed here that $K = m \times n$, where $K$ is the total number of characters available for input; $m$, the number of current drive circuits 2 or the number of characters arranged in the rows of the character-position indication plate 3; and $n$, the number of the sense-line selection circuits 5 or the number of characters arranged in the columns on the plate 3. The circuit 1, comprising a reference oscillator 1$a$, a gate circuit 1$b$ and a ring counter 1$c$, controls the circuits 2 consisting of $m$ current drive circuits so as to operate in a sequential fashion. The oscillator, gate circuit and ring counter may be of any known type and therefore are not shown in detail in the diagram. The oscillator actuates the ring counter, and the gate circuit controls the start and stop operations of the counter. The ring counter has a plurality of output lines B preferably at least one for each current drive circuit. The circuits 2 having m transistors or field effect transistors are controlled by the drive control circuit 1 (i.e., by the outputs of ring counter 1$c$). Current drive lines D comprise $m$ pairs of current drive lines $D_{11}$ and $D_{12}$, $D_{21}$ and $D_{22}$, . . . , and $D_{m1}$ and $D_{m2}$. Each pair of the current drive lines corresponds to each of the m current drive circuits 2. For example, when the second current drive circuit 2 is driven, two predetermined currents opposite in polarity, flow in a pair of current drive lines $D_{21}$ and $D_{22}$ respectively. The plate 3 is illustrated in more detail in FIG. 2. This plate 3 is composed of a character plate 12, the current drive lines D, sense lines S, and a support plate 13. The sense lines S consist of *n*-pairs of lines $S_{11}$ and $S_{12}$, $S_{21}$ and $S_{22}$, . . . , and $S_{n1}$ and $S_{n2}$. Each of the pairs corresponds to each of n sense-line selection circuits 5. These circuits 5 including diodes, transistors, and other similar elements are used for electrically connecting the sense lines S, pair by pair, via a sense-signal detection line 11, to the sense-signal detection circuit 6 under the control of the circuit 4. The circuit which is comprised of an alternating current-type amplifier, detects the presence of any sense signal produced in the line 11 and supplies the detected sense signal to the circuit 1 through a gate signal line 10. The control circuit 4 is controlled by the control circuit 1 via a clock line 9 to actuate the circuits 5 in sequence. The control circuit 4 operates in a manner similar to that of circuit 1, i.e., it preferably comprises a multi-stage ring counter which is advanced one stage at a time after the ring counter 1c is advanced m times. The control state of the circuit 4 is changed one by one in response to the control signal supplied from the circuit 1. More specifically, the control state of the circuit 4 changes it state by one as soon as all the drive circuits 2 have each been driven one time. Output line group G having output lines $G_1$, $G_2$, . . . , and $G_n$ operates to apply the control information of the control circuit 4 to the circuits 5 and to electrically connect only one pair of the sense lines S to the sense-signal detection circuit 6.

Figure 2:
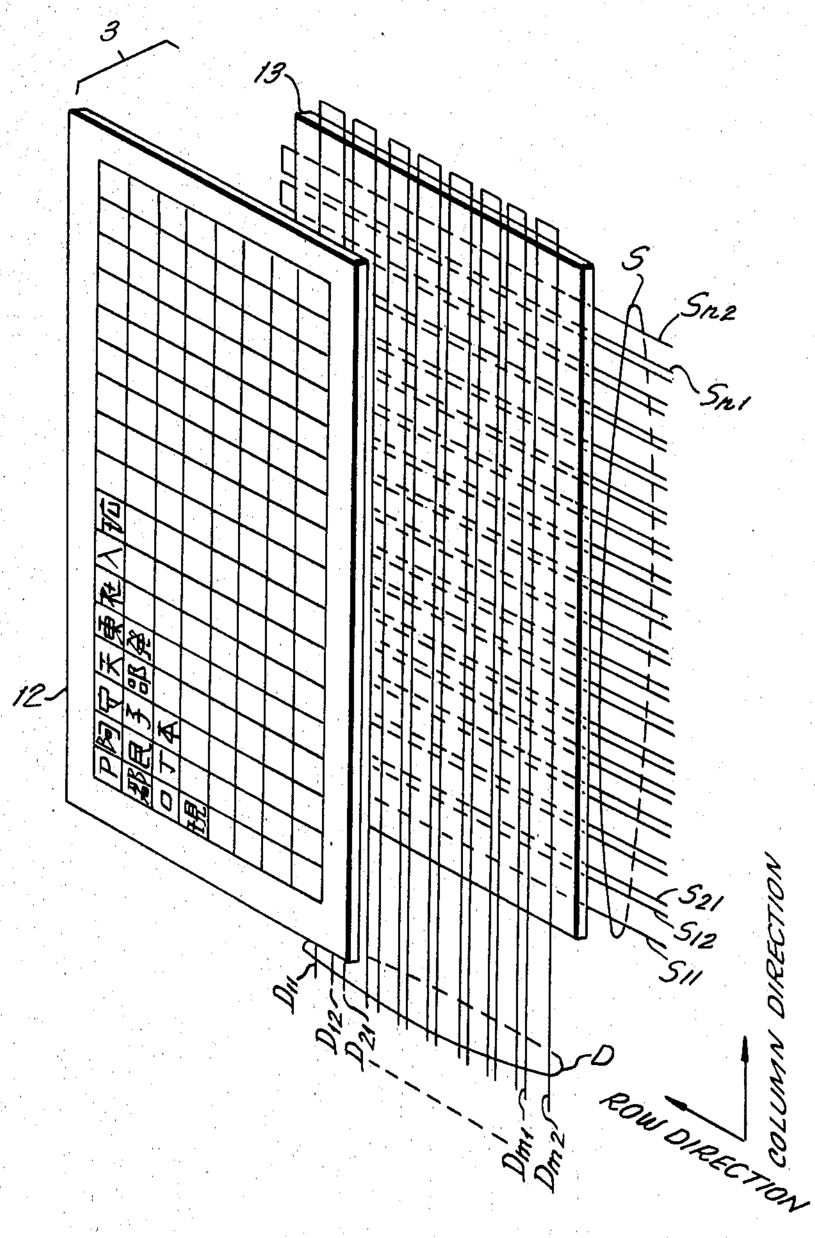
FIG. 2 shows more in detail a diagram of the character-position indication plate shown in FIG. 1.

Referring now to FIG. 2, a detailed description of the plate 3 as shown in FIG. 1 will be given below.

Chinese characters are printed on the character plate 12 in rows and columns. The current drive lines D and sense lines S are disposed respectively along the upper and lower surfaces of the support plate 13, which is located under the plate 12. There are K square cells enclosed by individual pairs of current drive lines D and sense lines S. One square cell corresponds to one character. The free ends of drive lines D and sense lines S are electrically connected by shunt conductors D and S pair by pair, respectively, to form closed loops. The support plate 13 supports the drive lines D and sense lines S and electrically insulates these lines D and S from each other. These lines D and S are kept in close contact with the top and bottom surfaces of the plate 13, respectively. As a practical matter, the character plate 12 is in close contact with the top surface of the support plate 13. Both the plate 12 and 13 are made of materials such as paper to permit the magnetic flux to pass therethrough without attenuation.

Figure 3:
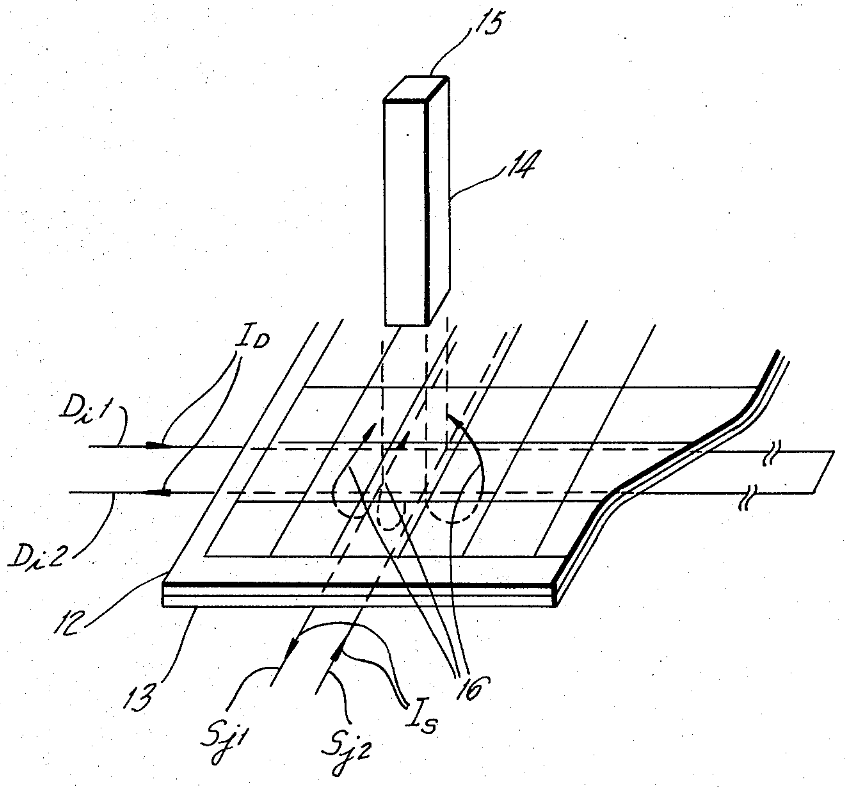
FIG. 3 shows a partially enlarged view of the plate shown in FIG. 2.

In FIG. 3 which illustrates the plate 3 with a part of it enlarged, the selection of a desired character on the plate 12 is carried out by bringing the indicator bar 14 in close proximity to the desired character. One end 15 of the bar 14 which is made of ferrite, is smaller than the square cell formed by the pair of current drive lines D and sense lines S.

The operation of the character input equipment of the invention will now be briefly described with reference to FIGS. 1 through 3.

It is assumed that the bar 14 is brought close to a desired character enclosed in a cell defined by the i-th position (where $1 \leq i \leq m$, $i = 1, 2, \ldots,$ and $m$) in the row direction and the $j$-th position (where $1 \leq j \leq n$, $j = 1, 2, \ldots,$ and $n$) in the column direction. Upon receipt of the control signal from the drive control circuit 1, a predetermined current is caused to flow only in one pair of the drive lines D. In other words, at a certain instant during the time sequence, only one of the *m* pairs of drive circuits 2 operates, and as a result, a current change is produced only in one pair of the drive lines D serving as output lines from the circuits 2. The circuit 1 in FIG. 1 controls the circuits 2 from top to bottom one by one. Hence, the initial control state of the circuit 1 returns only after the circuits 2 have finished m times of operations sequentially. The circuit 4 for controlling the circuits 5 is operated by the circuit 1 through the clock line 9 so as to change its state after one full cycle of the circuit 1, namely after all the circuits 2 have each changed their states one time. The output of the circuit 4 is selectively applied to the circuits 5 via the output line group G. As has been described above, the circuits 5 controlled by the circuit 4 connect the sense lines S, pair by pair, from left to right, to the sense-signal detection circuit 6. In order to connect all the pairs of the sense lines S to the circuit 6, it is necessary for the circuit 4 to change its control state n times. Thus, the contents of the circuits 2 must be changed a total of $m \times n$ times.

When the bar 14 is brought in close proximity to the character associated with the *i*-th and *j*-th positions, a current $I_D$ shown in FIG. 3 flows in the pair of lines $D_{i1}$ and $D_{i2}$ in the row direction under the condition that the circuit 1 changes its state $m \times (j-1) + j$ times (including the initial control state) after the first one of the circuits 2 has operated, which causes a current change in the pair of lines $D_{11}$ and $D_{12}$. At this point in time the control circuit 4 is placed in the control state, permitting the pair of sense lines $S_{j1}$ and $S_{j2}$ to be connected to the circuit 6, from its initial control state with a pair of sense lines $S_{11}$ and $S_{12}$ connected to the circuit 6. For this reason, a magnetic flux change 16 of high density occurs near the end of the bar 14 due to the change in the current appearing in the lines $D_{i1}$ and $D_{i2}$. This magnetic flux change 16 causes a current change Is to flow in the sense lines $S_{j1}$ and $S_{j2}$ in the arrow-marked direction of FIG. 3. Bar 14 thus serves to form an electro-magnetic coupling between a pair of current drive lines D and a pair of sense lines S. More specifically, the bar 14 functions to reduce the magnetic circuit resistance between the pair of current drive lines and sense lines.

The current change Is induced in the pair of sense lines $S_{j1}$ and $S_{j2}$ is supplied to the sense-signal detection circuit 6 since the control circuit 4 is in the state where the lines $S_{j1}$ and $S_{j2}$ are connected to the circuit 6. Therefore, the circuit 6 detects the current change Is and amplifies it to a suitable level for application to the gate circuit **1*b* through the gate signal line 10 to decouple oscillator 1*a* from ring counter 1*c*. The circuit 1 thus stops its control operation in response to the detection of the sense signal from the circuit 6. The control state of the circuit 1** retains the contents of the *i*-th current drive circuit 2, while the control state of the circuit 4 holds the contents of the $j$-th sense line S.

Thus, by transferring these contents as outputs to data output lines 7 and 8, the designated character is converted into the corresponding coded-electrical signal.

Figure 4:
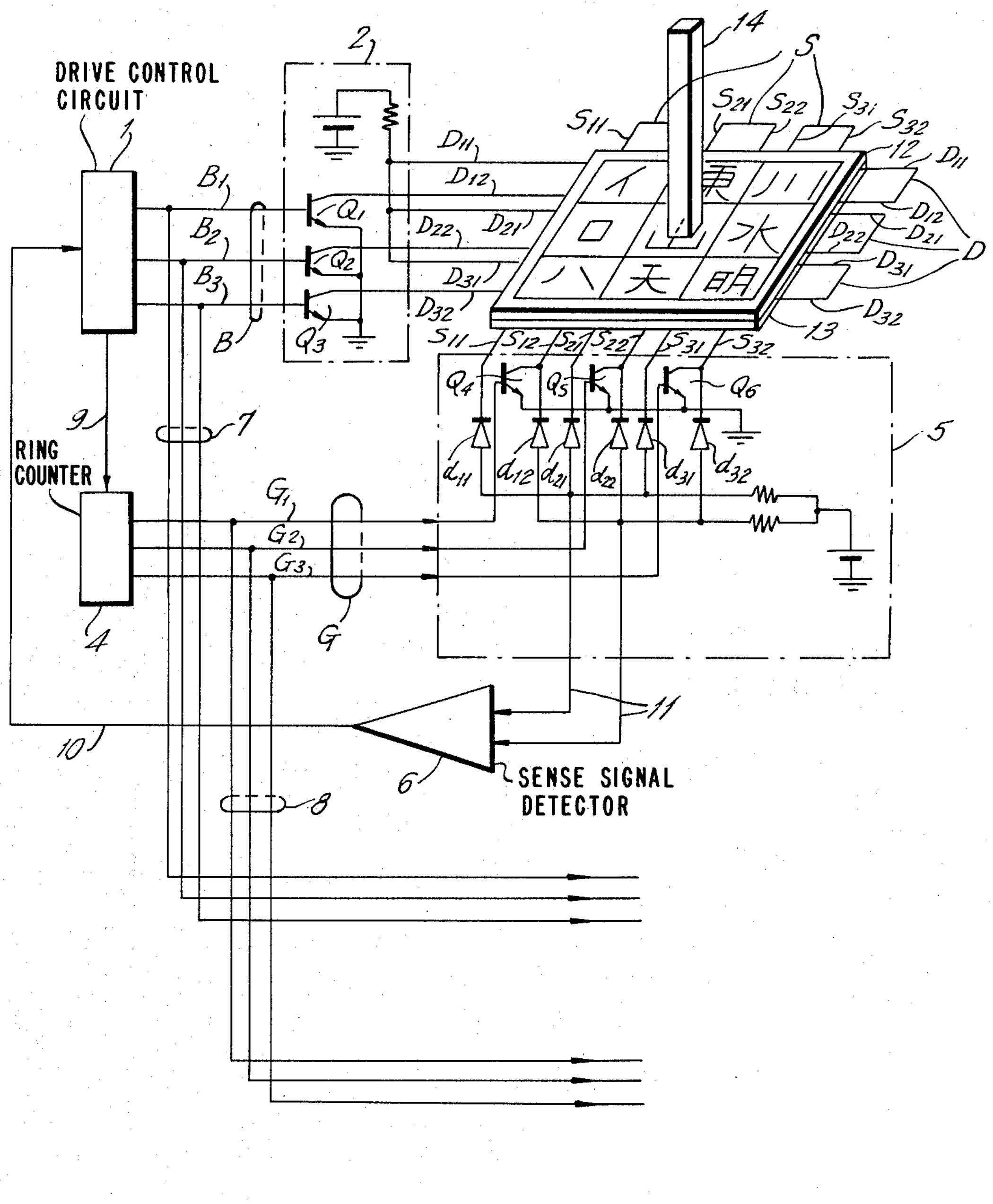
FIG. 4 shows a diagram illustrating in detail several constituents in operation of the embodiment of the invention.
Figure 5:
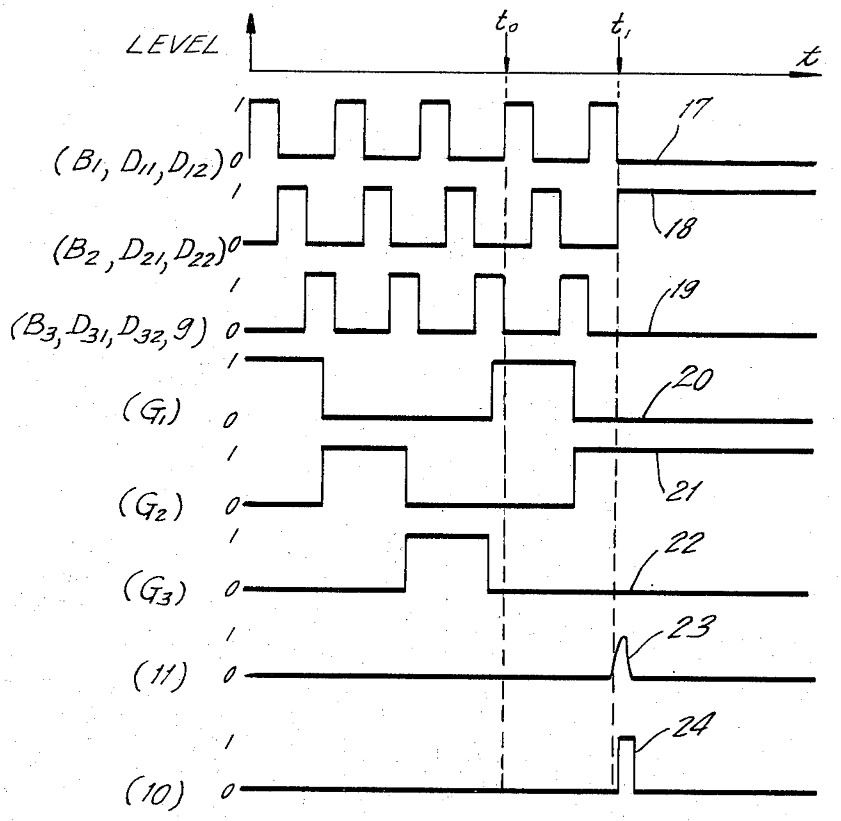
FIG. 5 is a time chart of waveforms appearing in the circuits of the equipment shown in FIG. 4.

Referring to FIG. 4 which shows a diagram illustrating in detail the means of the embodiment of FIG. 1, and to FIG. 5 which shows waveforms appearing at various points in the circuit of the equipment shown in FIG. 4, the reference letters and numerals such as $B_1$ and 10 in brackets at the left margin indicate the waveforms appearing in the circuits and signal lines marked by corresponding reference letters and numerals.

In FIG. 4, both the values m and n are assumed to be 3. The number of characters in this example which are available for input is therefore $3 \times 3 = 9$. Also, the current drive circuits 2 comprise three NPN transistors $Q_1$, $Q_2$ and $Q_3$. The circuits 5 includes three NPN transistors $Q_4$, $Q_5$ and $Q_6$, and diodes $d_{11}$, $d_{12}$, $d_{21}$, $d_{22}$, $d_{31}$ and $d_{32}$.

It is assumed also that, at time point $t_o$, the bar 14 is brought in close proximity to the character "工" located at the "second" position in both the rows and columns of character plate 12. Then the current change Is is sensed in the pair of sense lines $S_{21}$ and $S_{22}$ only when two requirements are satisfied; one in which a signal 18 for driving the circuits 2 is generated in one output line $B_2$ of the circuit 1 at time point $t_1$, while the transistor $Q_2$ of the circuits 2 is operated to the "ON" state, and a predetermined current 18 flows in one pair of current drive lines $D_{21}$ and $D_{22}$; and the other in which a signal 21 for operating the circuits 5 is produced at time point $t_1$ in the output line $G_2$ of the circuit 4, while the transistor $Q_5$ of the circuits 5 is operated to the ON state, and the diodes $d_{21}$ and $d_{22}$ turn ON. A signal 23 corresponding to the current change Is is thus applied to the circuit 6 through the sensesignal detection line 11. In FIG. 4, where $m = 3$, $i = 2$ and $j = 2$, a gate signal 24 is produced in the gate signal line 10 used as the output of the circuit 6, if the circuit 1 changes its control state five times {i.e., $3 \times (2-1) + 2 = 5$}. Immediately after the operation of the circuit 1 has been stopped by the gate signal 24, the waveforms 17, 18 and 19 appear corresponding to the output lines $B_1$, $B_2$ and $B_3$ of the circuit 1. These waveforms, if expressed in binary code, will be (0, 1, 0). Also, the waveforms 20, 21 and 22 corresponding to the output lines $G_1$, $G_2$ and $G_3$ of the circuit 4 will be (0, 1, 0). For this reason, the character "工" is delivered as an output of position signals (0, 1, 0) and (0, 1, 0) from the output lines 7 and 8. The gate control signal 24 on line 10 may be utilized to indicate that the stepping of control circuits 1 and 4 is completed and that the outputs of line groups 7 and 8 may be read as the code identifying the desired character. These output lines are connected, for example, to a computer in which the character "工" is received as said position signals.

In the above-mentioned embodiment of the invention, the equipment is intended to process "kanji" inputs. However, it will be apparent that the character input equipment is capable of handling other characters such as alphanumeric and symbolic characters.

In addition to the foregoing embodiment, the invention permits various modifications as follows:

For example, in place of the bar 14 made of ferrite, other magnetic materials may be used. Also, the above-described electro-magnetic coupling may be performed by eddy current phenomenon. More specifically, a conductor bar capable of generating the eddy current may be used in place of the bar14, by which a pair of current drive lines D and sense lines S are coupled with each other. In the embodiment, the bar 14 is brought close to the desired character on the plate 12. Instead, the bar 14 may come into close contact with the desired character.

The control method employed in the above embodiment may be replaced by other suitable control methods. For example, the m drive circuits 2 are divided into E groups (where $1 \leq E \leq m$) and it is so arranged that only when all the circuits 2 included in one (for example, F-th group) of the E divided groups are driven once by the circuit 1, the circuits 2 and the circuit 4 may be controlled by the circuit 1 so that the control circuit 4 changes its control state once. Furthermore, the circuit 1 may be arranged to alter its control state in such a manner that the circuits 2 comprised in the $(F+1)$-th group are driven after the circuit 4 has altered its control state by n times, or all the sense lines S have been once connected to the circuit 6.

As will be evident from the foregoing description, the present invention makes it possible to maximize the reliability and durability of the equipment because the invention does not substantially resort to mechanical components. In addition, the size of the equipment can be small enough even if it deals with a variety of characters and symbols. When the current drive lines and sense lines are arranged on the plate by the use of the printed circuit technique, the manufacturing cost of the equipment can be markedly reduced.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A character input equipment comprising:

a character plate having a plurality of characters arranged in rows and columns in a matrix form;

a plurality of pairs of spaced parallel current drive lines disposed corresponding to each row direction beneath said character plate;

a drive means having a plurality of current drive circuits for sequentially supplying a drive current pulse to said pairs of current drive lines one pair at a time;

a plurality of pairs of spaced parallel sense lines disposed corresponding to each column under the plate and perpendicularly intersecting the plurality of current drive lines whereby the four intersections formed by each pair of drive and sense lines underlies one of said characters;

a sense signal detection circuit;

sense means coupled to said drive means and having sense line selection circuits for sequentially coupling one of said sense line pairs to said detection circuit said sense means being advanced after all of said drive lines have received a drive current pulse;

a single indication bar adapted to be positioned in close proximity to the character plate and at any location along the surface thereof for selecting a desired character on the plate and for electromagnetically coupling a pair of current drive lines with a pair of sense lines corresponding to the character associated therewith;

said sense signal detection circuit having means for detecting current changes in the sense line pair connected thereto and caused by bringing the bar close to a desired character on said plate when one of the drive line pairs is pulsed, said current being supplied to the current drive line corresponding to the desired character in the row position on the character plate;

means coupled to said detection circuit for halting the stepping of said drive line circuits when said detection means is activated;

and means coupled to said drive circuits and said sense line circuits for transferring the binary outputs thereof and relating to the selected character to utilization means whereby the binary signals correspond to the character on the character plate upon which said bar is positioned.

* * * * *